United States Patent [19]
Umezawa et al.

[11] Patent Number: 5,800,920
[45] Date of Patent: Sep. 1, 1998

[54] DURABLE POLYURETHANE FIBER AND METHOD FOR THE MANUFACTURE THEREOF

[75] Inventors: Masao Umezawa, Kurita-gun; Hideki Nakanishi, Otsu; Tsutomu Watanabe, Koka-gun, all of Japan

[73] Assignee: Dupont Toray, Chuo-Ku, Japan

[21] Appl. No.: 700,488

[22] PCT Filed: Mar. 3, 1995

[86] PCT No.: PCT/US95/02584

§ 371 Date: Sep. 4, 1996

§ 102(e) Date: Sep. 4, 1996

[87] PCT Pub. No.: WO95/23883

PCT Pub. Date: Sep. 8, 1995

[30] Foreign Application Priority Data

Mar. 4, 1994 [JP] Japan ..................... 6-059976

[51] Int. Cl.[6] .................. D02G 3/00; C08G 18/00; C08G 18/08; C08G 18/70

[52] U.S. Cl. ................ 428/364; 428/394; 528/44; 528/55; 528/67

[58] Field of Search ................... 428/364, 374, 428/394; 528/44, 55, 67

[56] References Cited

U.S. PATENT DOCUMENTS

| | | | |
|---|---|---|---|
| 3,630,657 | 12/1971 | Setzer | 8/115.5 |
| 4,106,313 | 8/1978 | Boe | 66/202 |
| 4,837,292 | 6/1989 | Lodoen | 528/63 |
| 4,871,818 | 10/1989 | Lodoen | 528/66 |
| 5,000,899 | 3/1991 | Dreibelbis et al. | 428/364 |
| 5,565,270 | 10/1996 | Rehbold et al. | 428/364 |

*Primary Examiner*—Newton Edwards

[57] ABSTRACT

A durable dry-spun, polyurethane fiber exhibits a small angle X-ray scattering pattern that forms a layer line scattering image or an eyebrow-shaped four dot scattering image. The fiber is particularly useful in pantyhose, undergarments and the like.

14 Claims, 3 Drawing Sheets

DURABLE POLYURETHANE FIBER AND METHOD FOR THE MANUFACTURE THEREOF

FIELD OF THE INVENTION

The present invention relates to a polyurethane fiber and to a process for manufacturing such fibers. More particularly, the present invention concerns such a polyurethane fiber of fine decitex that has a combination of characteristics that make it particularly suited for use in highly durable pantyhose and other undergarments.

DESCRIPTION OF THE PRIOR ART

Polyurethane fibers are characterized by high elasticity and are widely used in numerous applications. Such fibers are known from, for example U.S. Pat. No. 3,184,426. Novel combinations of characteristics have been demanded of such fibers as the range of applications for the fibers has grown. For example, such combinations of characteristics have included high strength, high elongation, high elastic recovery, good heat setting, high mechanical and elastic durability, as well as resistance to degradation by mold and other environmental conditions. Such a combination of characteristics is particularly needed in fine (i.e., low decitex) polyurethane fibers that are intended to be incorporated into garments such as pantyhose, stockings, swimsuits, underwear, tights, etc.

Several well-known publications discuss the structures and properties of polyurethane fibers. For example, *Kobunshi Bussei to Bunshi Kozo* [Polymer Properties and Molecular Structure], published Mar. 10, 1973 in Special Edition 58 of Kagaku Dojinsha, pages 207 to 229, describes the known relationships between the structure and properties of polyurethaneureas, in which various diamines were used as chain extenders. However, the publication provides no specific examples that suggest a polyurethane fiber having the above-described combination desired characteristics, or how a particular polyurethane composition could result in a fiber with a specific structure and such a combination of characteristics. Also, there is no disclosure of the relationship between the structure and properties of polyurethanes made with diol chain extenders.

*Kobunshi Ronbunshu* [Polymer Essays], Vol. 45, No. 10, published October 1988, pages 795 to 802, discloses an example in which a diol is used as a chain extender, but makes no reference to a polyurethane fiber that satisfies the aforementioned combination of desirable characteristics. Further, the present inventors know of no disclosures of a polyurethane fiber having the combination of characteristics desired for the fibers of the present invention. Although general methods have been disclosed for dry spinning solutions of diol-extended polyurethanes into filaments, the art provides no specific descriptions of conditions Under which a specific diol-extended polyurethane is dry spun under to provide the desired fibers of the present invention.

An object of the present invention is to provide a durable polyurethane fiber of fine decitex that has high strength, high elongation, good elastic recovery, low set, and good heat setting characteristics as well as good resistance to mold and other detrimental environmental agents and a method for manufacturing such fibers

SUMMARY OF THE INVENTION

The present invention provides a durable polyurethane fiber that exhibits in small angle X-ray scattering a scattering image that is different from those obtained with conventional polyurethane fibers. The polyurethane has a structural formula

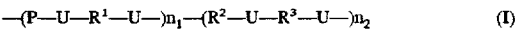

$$-(P-U-R^1-U-)_{n_1}-(R^2-U-R^3-U-)_{n_2} \quad (I)$$

wherein P is a polyol residue, $R^1$ and $R^3$ are the same or different diisocyanate residues, $R^2$ is a diol residue, U is a urethane bond, and $n_1$ and $n_2$ are each the number of repeating units, the number being in the range of 1 to 10. The polyurethane fiber of the present invention is characterized in that the fiber exhibits a small angle X-ray scattering, image having a long period in the direction of the meridian of 7 to 16 nanometers, and the image is an eyebrow-shaped four dot scattering image which has a long period in the direction of the equator of 13 to 30 nm or an image of layer line dots.

The process for preparing the durable polyurethane fiber of the invention involves dry spinning a solution of polyurethane in an organic solvent, the polyurethane having a structural formula expressed by formula (I) above. The process is characterized in that the polyurethane has an additive ratio (NCO/OH) in the range of 1.7 to 3, wherein NCO is the number of isocyanate groups based on diisocyanate and OH is the number of hydroxyl groups based on polyol (but not including the hydroxyl groups that are based on the diol chain extender), a hard ratio $(r_2/n_1)$ in the range of 0.65 to 3, a number average molecular weight in the range of 30,000 to 200,000, and a softening point in the range of 130° to 250° C.

BRIEF DESCRIPTION OF THE DRAWINGS

The invention will be better understood by referring to the drawings. In FIGS. 1 and 2, the meridian line of the schematic image is designated 1; the equatorial line, 2; the layer line scattering image, 31; and the eyebrow-shaped four dot scattering image, 32.

DETAILED DESCRIPTION OF PREFERRED EMBODIENTS

When subjected to small-angle X-ray scattering, conventional polyurethane fibers are known to produce several scattering image patterns. A typical pattern is a two dot scattering image. Some conventional polyurethane fibers do not exhibit small angle X-ray scattering patterns. In contrast, polyurethane fiber of the present invention exhibits a layer line scattering image or an eyebrow-shaped four dot scattering image. These images distinctly differ from the images obtained with conventional polyurethane fibers. These differences are evident by comparing the photographic images of FIGS. 3, 4 and 5 which were produced with polyurethane fibers of the invention with the photographic image of FIG. 6 which was produced with a polyurethane fiber outside the invention. The two types of scattering images from fibers of the invention will now be discussed in further detail; the layer line image first and then, the eyebrow-shaped four dot image.

Figure 1:
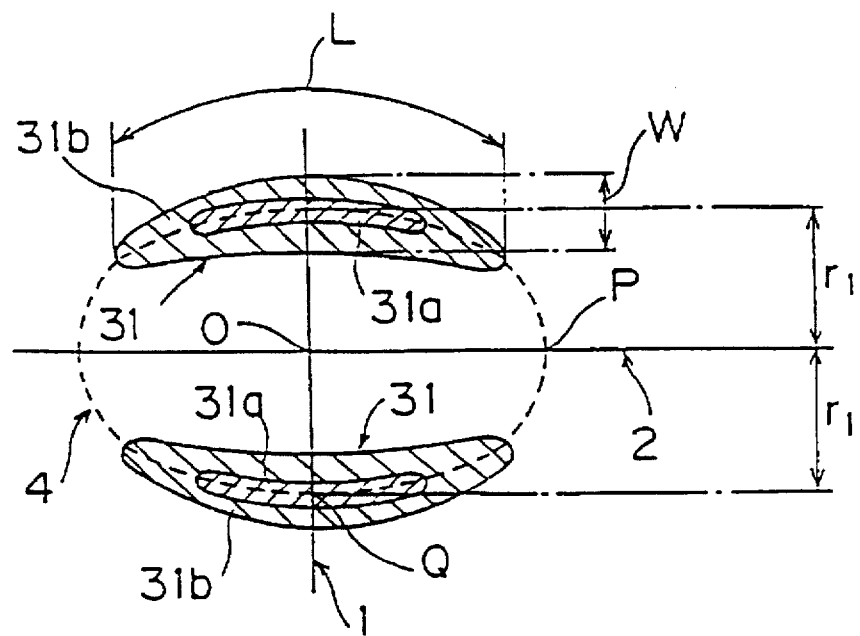
FIG. 1 is a schematic diagram which depicts a layer line small-angle X-ray scattering image of a polyurethane fiber of the invention.

FIG. 1 schematically illustrates an example of a layer line scattering image obtained with a polyurethane fiber of the present invention when subjected to small angle X-ray scattering testing. The layer line scattering image is composed of at least pair of layer line dots 31 that are located on opposite sides and equidistant from, equator 2. For each dot 31, the X-ray scattering image typically appears in a regular distribution. Parts 31a of the image, in the vicinity of the meridian, exhibit a high level of scattering intensity. The present inventors found that for improved fiber durability, the dot ratio of each dot 31 should be at least 1.5. The dot ratio is defined herein as the ratio L/W, wherein L is the length of the center line of the dots 31 and W is the maximum width of the dots 31. When two or more pairs of dots are present, this measurement is carried out for the pair of dots having the highest image intensity.

When an oval 4 can be drawn through the center lines of a pair of dots 31, as shown in FIG. 1, a long segment OP and a short segment OQ respectively overlap the equator and the meridian. Typically, for fibers of the invention, the long/short segment ratio, (OP/OQ), is at least 1.3, for improved yarn durability. Point O is the intersection of meridian 1 and equator 2. Point P is the intersection of oval 4 and equator 2. Point Q is the intersection of oval 4 and meridian 1. Pair of dots 31 is symmetrical with respect to the meridian 1 and the equator 2. A similar analyses can be employed even when an oval cannot be drawn through the centerline of the dots of a scattering image, as for example when a pair of dots is parallel to and widens out from the equator.

Figure 2:
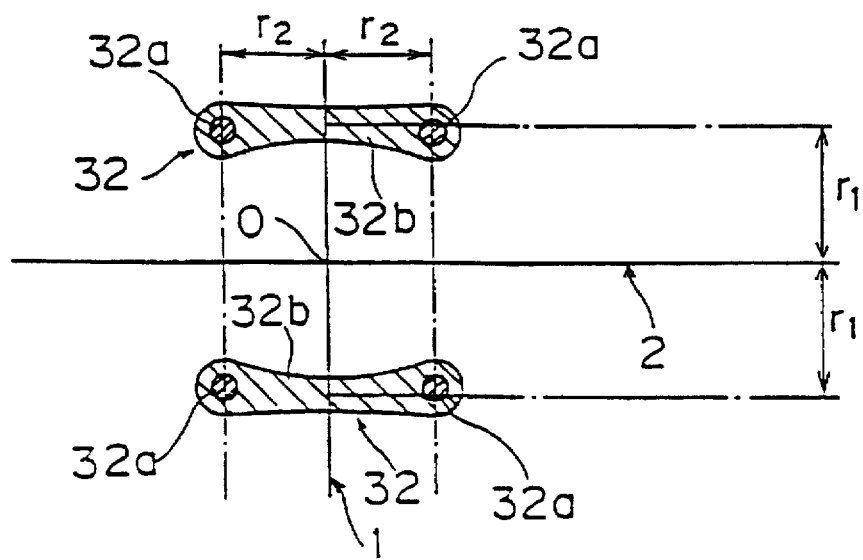
FIG. 2 is a schematic diagram which depicts an eyebrow-shaped four dot small-angle X-ray scattering image of another polyurethane fiber of the invention.

An eyebrow-shaped four dot scattering image for a polyurethane fiber of the invention is illustrated schematically in FIG. 2. The eyebrow-shaped four dot scattering image is composed of at least one pair of eyebrow-shaped dots 32 that oppose each other from opposite sides of, and at equal distances from, the equator 2. Each dot 32 has a part 32a with a strong scattering intensity on both sides of the meridian 1. In other words, for both of the dots 32, the scattering intensity of the parts 32a on both sides is stronger than the parts 32b (the part in each dot 32 that intersects the meridian 1). In this way, since each dot 32 has two parts 32a (two spots) with a strong scattering intensity, one pair of dots 32 has four parts 32a (four spots) having strong scattering intensity. Pair of dots 32 is symmetrical with respect to both meridian 1 and equator 2.

In FIGS. 1 and 2, the parts with high scattering intensities are divided into 31a and 32a, but these are not parts in which the intensity changes discontinuously with respect to 31b or 32b, but are parts in which the intensity increases in a continuous manner, and typically with a regular distribution, as schematically illustrated in FIGS. 1 and 2.

The polyurethane fiber of the invention has, in the case of a layer line scattering image, a long period only in the direction of the meridian, and in the case of an eyebrow-shaped four dot scattering image has a long period in both the direction of the meridian and the direction of the equator. The long period J can be found from the Bragg formula, which is expressed as $$J=\lambda/2\sin[\{\tan^{-1}(r/R)\}/2]$$

wherein $\lambda$ is the X-ray wavelength, R is the camera radius (the distance between the measurement sample and the film), and r is described below.

In the case of a layer line scattering image, such as the scattering image shown in FIG. 1, the long period in the direction of the meridian is determined from the Bragg formula given above. The value for r is the distance $r_1$ from the equator 2 to the center (the point of maximum density) of the dot 31. In the case of an eyebrow-shaped four dot scattering image, such as the scattering image shown in FIG. 2, the long period in the direction of the equator is determined from the Bragg formula with the value of r being the distance $r_2$ from meridian 1 to the part of the dot 32 having the highest scattering intensity.

The values for $r_1$ and $r_2$ preferably are measured from a negative, and not a positive, of the small angle X-ray scattering image photograph. Measurements taken from the negative help eliminate possible magnification irregularities that occur when the negative image is developed into a positive image.

Polyurethane fiber of the invention exhibits a small angle X-ray scattering image, both in the case of a layer line scattering image and in the case of an eyebrow-shaped four dot scattering image., that has a long period in the direction of the meridian in the range of 7 to 16 nm, measured from the scattering image. A particularly preferred range for this long period is 9 to 13 nm. The present inventors found that when the long period in the direction of the meridian is in the range of 9 to 13 nm, the strength of the polyurethane fiber is increased. Particularly in applications requiring exceptional durability, such as undergarments, every course pantyhose and the like (hereafter referred to simply as undergarments), markedly higher strength and durability are obtained with polyurethane fibers of the invention than with conventional polyurethane fibers.

In addition to a 7 to 16 nm long period along the meridian of the scattering image, when a polyurethane fiber of the invention exhibits an eyebrow-shaped four dot scattering image, the image also has a long period in the direction of the equator in the range of 13 to 30 nm, preferably 15 to 22 nm. A fiber having such a value has especially high durability for practical purposes.

The small angle X-ray characteristics reported herein were measured as follows. Samples of polyurethane fibers were aligned, cut into 4-cm lengths, weighed out into 40 mg portions and assembled for measurement. An X-ray generating device, Model PU-200, made by Rigaku Denki, was used with an X-ray source of CuK$\alpha$ rays (Ni filter; 1.5418 Å wavelength) at an output of 50 kV, 200 mA through a slit diameter of 0.3 mm. A Kissig camera was employed with a camera radius of 400 mm, a 120-minute exposure time and Kodak DEF-5 film.

The composition and molecular structure of the polyurethane that constitutes the fiber of the present invention will now be described.

In accordance with the invention, the polyurethane is a diol-extended polyurethane expressed by formula (I) above. A diol extended polyurethane makes it possible to produce a fiber having a suitable heat setting properties, as well as suitable elastic recovery and high strength. A small amount of urea bonds also may be present in the polyurethane molecule, so long as the urea bonds do not interfere with the effects of the invention.

There are no particular restrictions on the diol chain extender that becomes the diol residue R2 in formula (I) and is positioned in the polyurethane molecule to provide urethane bonds. A wide range of conventional, well-known diols can be used. A compound having three or more hydroxyl groups, such as glycerol, may be jointly used as a chain extender, so long as it does not interfere with the effect of the present invention. Among suitable diol chain extenders for use in preparing the polyurethane are ethylene glycol (hereinafter abbreviated "EG"), 1,3-propanediol ("PDO"), 1,4-butanediol ("BDO"), neopentyl glycol, 1,2-propylene glycol, 1,4-cyclohexane dimethanol, 1,4-cyclohexanediol, 1,4-bis(β-hydroxyethoxy)benzene ("BHEB"), bis(β-hydroxyethyl)terephthalate, and paraxylenediol. Of these diol chain extenders, EG, PDO, BDO, and BHEB are preferred. EG is an especially preferred chain extender because polyurethane fiber obtained therewith has especially high strength, desirable elastic recovery, good heat setting and a high light resistance. Diol chain extenders are not limited to those consisting of only one diol, but may also consist of a number of types of diols.

In accordance with the invention, there are no particular restrictions on the starting material diisocyanates that become the diisocyanate residues $R^1$ and $R^3$ in formula (I) and are positioned in the polyurethane molecule to provide urethane bonds. A wide range of conventional, well-known diisocyanates can be used. A compound having three or more isocyanate groups additionally may be used, so long as it does not interfere with the effect of the present invention. Among the typical suitable diisocyanates are diphenylmethane diisocyanate (hereafter abbreviated as "MDI"), dicyclohexylmethane diisocyanate ("HMDI"), hexamethylene diisocyanate, xylene diisocyanate, tolylene diisocyanate, phenylene diisocyanate, naphthalene diisocyanate, and isophorone diisocyanate. MDI and HMDI are preferred. MDI is particularly preferred since the polyurethane fiber obtained has superior strength and high heat resistance, as well as good solvent resistance and the like. A polyurethane fiber that has been obtained through the use of HMDI also has significant advantages, e.g., improved light resistance when a suitable polyol and chain extender are selected. MDI is the preferred of the two. A single type, or a plurality of types, of diisocyanate may be used.

In accordance with the invention there are also no particular restrictions on the starting material polyol that becomes the polyol residue P in formula (I) and is positioned in the polyurethane molecule to provide urethane bonds. Examples of suitable polyols include polytetramethylene ether glycol (hereafter abbreviated as "PTMG") and copolymers thereof, polypropylene glycol and copolymers thereof, and other ether-based polyols, as well as polybutylene adipate glycol and copolymers thereof, neopentyl adipate glycol and copolymers thereof, the polyester polyols listed in Japanese Laid-Open Patent Application 4-41714 from page 3, column 1, line 13 to page 3, column 4, line 4, polycarbonate polyols (a type of polyester polyol), polysiloxane polyols, and other well-known polyols. Preferred ether polyols include PTMG and copolymers thereof. Typical examples of copolymers of PTMG include those obtained by adding ethylene oxide to the ends of PTMG, and tetrahydrofuran ("THF") and 3-methyl THF-copolymerized PTMG. A polyurethane fiber obtained using PTMG and/or a copolymer thereof as a polyol has excellent low temperature characteristics, superior mold resistance, superior elastic recovery, and also high hydrolysis resistance.

Other suitable polyols include polyester polyols to which side chains such as methyl groups have been attached. Examples of such polyols include glycols copolymerized with various aliphatic dicarboxylic acids and neopentyl glycols, including neopentyl adipate glycol, the polyester polyols listed in Japanese Laid-Open Patent Application 4-41714 from page 3, column 1, line 13 to page 3, column 4, line 4, and polycaprolactone diols obtained through the copolymerization of neopentyl glycol. Such ester polyols have superior mold resistance, superior chlorine resistance and light resistance, and also high hydrolysis resistance, and are thus especially preferred.

Typically the polyol has a number average molecular weight of in the range of 800 to 3500 to assure that the resultant fiber will have a satisfactory strength and elastic recovery. Preferably, the molecular weight is in the range of 800 to 2500 for polyols that have no side chains. Polyurethane fibers made from polyols having molecular weights within these ranges, have low temperature characteristics that are particularly faborable.

Blended polyol mixtures for use in making the polyurethane fibers of the invention have an average molecular weight in the range of 1200 to 2600 and are made with a polyol having a molecular weight in the range of 800 to 2500 and a polyol having a molecular weight in the range of 1600 to 4000. Use of such polyol mixtures, in comparison to use of only one polyol to give the same average molecular weight, results in a polyurethane fiber that has greater elongation and greater durability. This, for example, when polyol of 2200 average molecular weight is used for making the polyurethane, it is preferable to use a blend of polyols of 1800 and 3000 molecular weight than a sole polyol of 2200 molecular weight. Further, it is preferable to have the low molecular weight polyol as the principal polyol in the mixture.

As noted above, the polyol residue P of the polyurethane of formula I is not restricted to only one type of polyol residue. Several types of polyol residues may be used together, such as ether-based polyol residues and ester-based polyol residues. Depending on the application, there are also times when it is favorable to jointly use an ether-based polyol residue and an ester-based polyol residue.

In accordance with the invention, the additive ratio (NCO/OH), that is the ratio of the diisocyanate groups to hydroxyl groups, is least 1.7, to avoid producing polyurethane fibers with excessively low softening temperatures and with excessive tackiness. On the other hand, to avoid producing a polyurethane with insufficient elongation, the additive ratio is no greater than 3. Thus, the additive ratio according to the invention is in the range of 1.7 to 3. Additive ratios in the range of 1.8 to 2 are preferred for producing polyurethane fibers having particularly good heat setting characteristics.

The hard ratio of polyurethanes suitable for making fibers of the invention is in the range of 0.65 to 3. As used herein, the hard ratio is defined as the ratio $(n_2/n_1)$ wherein $n_2$ and $n_1$ represent the numbers of repeating units in formula (I) above. When the hard ratio is within the 0.65 to 3 range, the strength and heat settability of the resultant polyurethane fibers is increased. A preferred hard ratio for further enhancing these effects is in the range of 1 to 1.8. When the hard ratio is in the preferred range, of 1 to 1.8, $n_1$ is preferably set at 1 and $n_2$ is varied.

The polyurethane of the fibers of the invention have a number average molecular weight in the range of 30,000 to 200,000. When the number average molecular weight is within this range, fibers of high strength and and durability are obtained. A number average molecular weight of 60,000 to 120,000 is particularly preferred for the sake of improving these effects even more. The number average molecular weight of the polyurethane can be measured by, for example, preparing a calibration curve based on standard polystyrene using gel permeation chromatography (hereafter abbreviated as "GPC").

In formula (I) above, the numbers of repeating units, $n_1$ and $n_2$, are each in a range of 1 to 10. If either $n_1$ or $n_2$ is less than 1, fibers made of the polyurethane have inadequate strength, inadequate elongation and too low a softening temperature. When $n_1$ is greater than 10, the softening point of the resultant polyurethane is too low, and the desired fiber cannot be obtained. When $n_2$ is greater than 10, the softening point of the polyurethane is too high, and the elongation is too low, so the desired fiber again cannot be obtained. Although it depends also somewhat on the molecular weight of the polyol residue, the preferred values for each of $n_1$ and $n_2$ is in the range of 1 to 5. Within such ranges particularly good polyurethane fiber is obtained. Note that because polyurethane is a polymer, both $n_1$ and $n_2$ are average values thgat are not limited to integers.

Typically, the polyurethane fiber of the invention has a strength (braking tenacity) of at least 1.5 grams per denier (1.4 deciNewtons per tex) and a elongation (at break) of at least 300%. When the strength and elongation of the polyurethane fibers are at least these values, not only is the durability of the fabric produced with the polyurethane fiber increased, but the breakage of polyurethane fibers during fabric manufacture also is greatly reduced. The appearance of the fabric is also improved.

The polyurethane fiber of the invention has a softening temperature that is in the range of 130° to 250° C. When the softening point is higher than 130° C., another fiber may be readily used along with the fiber of the present invention. A softening temperature below 250° C., assures that the fiber can be heat set quite readily. Because of these considerations, a particularly preferred softening temperature is in the range of 150° to 230° C. The softening temperature of the polyurethane fiber is measured with a thermomechanical analyzer (hereinafter "TMA").

Polyurethane fiber of the invention is prepared by dry-spinning techniques. Polyurethane fibers of the invention prepared by these techniques have the various advantageous properties and characteristics described hereinbefore even when the fibers are very fine (i.e., of low decitex). Specifically, the fiber of the invention typically has a fineness of no greater than 30 den (33 dtex), preferably no greater than 20 den (22 dtex), and most preferably no greater than 15 den (17 dtex). Such fine polyurethane fibers of the invention are particularly suitable for undergarment applications and exhibit much greater durability than conventional polyurethane fibers. In particular, when a polyurethane fiber with a fineness of 3 to 30 den (3.3 to 33 dtex) is made into an undergarment, a comfortable and highly durable undergarment is obtained. The fiber of the invention can be in the form of monofilaments, of filaments adhered together as side-by-side coalesced strands, as yarns and the like. Two coalesced strands of the invention, adhered together in the fiber manufacturing process usually have somewhat better durability than monfilaments of the invention.

As used herein, the term "durability" means the ability of polyurethane fibers of the invention, when in fabrics, to resist abrasion without break as well as to resist failure induced by repeated folding and wear. Durability also includes within its meaning the ability of the fibers to undergo repeated expansion-and-contraction cycles without excessive set.

Polyurethane fibers of the invention may contain various additives for particular purposes, so long as the additives do not interfere with the effects of the invention. Among such additives are benzotriazole-based stabilizers, ultraviolet light absorbers, hindered amine-based stabilizers, other light resistance agents, hindered phenol-based stabilizers, other antioxidants, anti-tack agents, inorganic pigments such as titanium dioxide, iron oxide, barium sulfate, zinc oxide and cerium oxide, silver ion-containing inorganic substances, lubricants, mineral oil, silicone oils, antistatic agents and the like.

General methods will now be described for dry spinning polyurethane fiber according to the invention from a solution of the polyurethane in an organic solvent. In one general method, a polyurethane is dissolved in a solvent to obtain a polyurethane solution, which then is dry spun. In a second general method, a polyurethane is synthesized in a solvent to obtain a polyurethane solution which then is dry spun.

According to the first general method, one employs a polyurethane having the structural formula expressed by formula (I) having an additive ratio in the range of 1.7 to 3, a hard ratio ($n_2/n_1$) in the range of 0.65 to 3, a number average molecular weight in the range of 30,000 to 200,000, and a softening point in the range of 130° to 250° C. Conventional melt polymerization or solution polymerization techniques can be used for obtaining the polyurethane. There are no particular restrictions on the method of polymerization. For example, the polyurethane can be produced by first reacting a polyol to react with a diisocyanate to form an isocyanate-capped polyol which is then reacted with a diol to effect chain extension. Alternatively, a suitable diisocyanate, and a suitable diol chain extender can be reacted at the same time to synthesize the polyurethane. Note that there are no particular limitations on these processes when different kinds of polyols, diisocyanates and diols are used, or when polyol mixtures of different molecular weights are used. However, when substances of widely differing reaction rates are employed, it is preferable to react separately and then mix together. Such matters are known in conventional polyurethane manufacturing processes and are applicable also to the process of the invention.

There are no particular restrictions on the solvent that is used to dissolve the polyurethane. However the solvent composition should include at least one solvent selected from the group consisting of dimethylacetamide ("DMAC"), dimethylformamide ("DMF"), and dimethylsulfoxide ("DMSO"). DMAC is particularly preferred, both for the processes in which the polyurethane is dissolved in a solvent, and for the processes in which the polyurethane is synthesized in the solvent.

The polyurethane for use in making fibers of the invention can be dissolved in the solvent by conventional techniques. Typical methods include mixing and dissolution are aided by stirring, ultrasound, high speed shearing and the like. When necessary, a dissolution adjuvant also may be used. The use of a polyurethane in the form of a powder or small chips facilitates dissolving of the polyurethane.

The following compounds, among others, may also be suitably added to the polyurethane solution as needed: MDI, HMDI, hexamethylene diisocyanate, isophorone diisocyanate, and other diisocyanates and derivatives thereof (such as MDI-added butanediol, MDI-added ethylene glycol, and MDI-added polypropylene glycol, which are obtained by adding MDI to both ends of the diol), triphenyl methane triisocyanate, triphenyl methane triisocyanate-added butanediol, and MDI-added glycerol, which is obtained by adding MDI to glycerol.

The polyurethane solutions prepared as described above are then discharged through a die, dry spun and wound up on a package (e.g., in the form of a cake, a cheese of the like).

In the second general method of forming polyurethane fibers of the invention, the polyurethane is synthesized directly in a solvent. The polyurethane dissolves in the solvent to form a solution that is then dry spun as in the first-described process.

The polyol and the diisocyanate are mixed and reacted in quantities such that the additive ratio is in the range of 1.7 to 3. There are no particular restrictions on the procedure for this reaction, and conventional methods can be used. Such methods include ordinary stirring, subjecting the solution to ultrasound during stirring, and/or using a homomixer, a static mixer, a biaxial extruder, a kneader or the like. The reaction produces an isocyanate-capped polyol which is dissolved in a solvent. Preferably, the solvent for the capped polyol is the same solvent as will be used for making the polyurethane solution that is to be dry spun. The same methods and solvents as used in the first general method can be used in this method as well for dissolving the diisocyanate capped polyol. DMAc is the most preferred solvent.

After the isocyanate-capped polyol is dissolved in the solvent, a diol is added to effect chain extension. The diol chain extender is added in a quantity sufficient achieve a hard ratio in the range of 0.65 to 3 and to form the polyurethane of formula I above. Alternatively, the chain extension can be accomplished by first reacting the diisocyanate with the diol to form a low molecular weight urethane whose ends are hyroxyl groups, and then using the low molecular weight urethane as the chain extender. Specifically, in the latter chain extension step, the following compounds are examples of compounds that may be added to diol that is a chain extender: MDI, HMDI, hexamethylene diisocyanate, isophorone diisocyanate, and other diisocyanates and derivatives thereof (such as MDI-added butanediol, MDI-added ethylene glycol, and MDI-added polypropylene glycol, which are obtained by adding MDI to both ends), triphenyl methane triisocyanate, triphenyl methane triisocyanate-added butanediol, and MDI-added glycerol, which is obtained by adding MDI to glycerol, and other triisocyanates. Monoisocyanates, monoamines, monools, and other chain terminating agents, for example, also may be added. The polyurethane made by this method has a number average molecular weight in the range of 30,000 to 200,000 and a softening temperature in the range of 130° to 250° C. To assure that a polyurethane is obtained having softening temperature in the recited range, preliminary tests may be conducted to determine the proportions and the particular polyol, diisocyanate, and chain extender diol that should be employed.

The process of forming the polyurethane directly in solvent may be performed in one step. For example, such a method is disclosed in Japanese Patent Tokukai s60-206817 (Kokai 1985), wherein polyol and diol are dissolved in solvent and then diisocyanate is added to effect polymerization. In this one-step method, the additive ratio of polyol and diisocyanate are the same as described above. The one-step method offers the potential of low cost production.

After the polyurethane solution is formed, as noted hereinbefore, various additives for specific purposes can be added to the solution, and the solution can then be discharged through a die and dry spun in a conventional manner and finally wound up as a yarn package.

In the dry spinning step, the polyurethane solution typically is heated at a temperature that is within 70° C. of the polyurethane softening temperature, preferably within 30° C. of the softening temperature. The heating temperature is the temperature of the wall surface of the spinning cylinder during dry spinning. When heating at such a temperature is carried out, there is little yarn breakage during spinning. Higher heating temperatures within the desired range result in fibers of higher elongation. The preferred heating temperature is the polyurethane softening temperature.

Yarn breakage during spinning can be minimized and spinning stabilized by employing a the draft ratio in the range of 5 to 150, and a take-off speed in the range of 300 to 2000 meters/minute. Although suitable spinning conditions depend on the composition of the polyurethane among otehr things, when a fiber of a higher elongation is desired,
the polyurethane is dry spun at a low draft ratio, preferably in the range of 7 to 50. On the other hand, shen a fiber of relatively low elongation is desired, the polyurethane is dry spun at a high draft ratio, preferably in the range of 30 to 100. In this way, a draft ratio can be selected to produce a polyurethane that is particularly suited for the desired end-use.

As used herein, the take-up speed is defined as the speed of the godet roller that first comes into contact with the polyurethane dry spun filaments after they are discharged from the die. The godet roller regulates the take-up speed of the filaments. The winding speed is defined as the speed at which the yarn is wound up on a package. The speed of the godet roller and the speed of the winding machine may be the same or different. A particularly preferred yarn winding method employs a winding speed that is 1.2 to 5 times as fast as the speed of the godet roller. When a yarn having higher strength is desired, a speed differential between the godet roller and the windup is employed. A particularly preferred ratio of winding speed to godet roller speed (called the "speed ratio") is in the range of 1.3 to 2.5. When yarn is wound using such a system, very high yarn speeds are achieved.

When a fine polyurethane fiber of no greater than 30 den (33 dtex) is sought, one typically employs a die that has an orifice diameter D in the range of of 0.1 to 0.35 mm and an L/D ratio of orifice length L to the orifice diameter D in the range of 1.1 to 5. When a polyurethane having a number average molecular weight of at least 50,000 is to be spun, a die having an L/D ratio in the range of 1.2 to 4 is preferred. When spinning is performed with such a die, a high strength, high elongation fiber is readily obtained.

To make a useful package, such as a cheese, on which dry spun polyurethane yarn of the invention is wound under high elongation with stable relaxation behavior, the speeds of the winder and its accompanying winder traverse are adjusted to form an average crossing angle in the fiber winding in the range of 5 to 18 degrees, preferably in the range of 6 to 12 degrees. The crossing angle is determined by the windup speed of the yarn, the speed of the windup traverse and the traverse width (i.e., the width of the cheese).

As noted hereinbefore, the polyurethane fiber of the invention is formed of a polyurethane of structural formula (I) above. When the fiber has a long period in the direction of the meridian measured with small angle X-ray scattering image of the fiber of 7 to 16 nm both in the case of a layer line scattering image and in the case of an eyebrow-shaped four dot scattering image, and a long period in the equatorial direction of 13 to 30 nm, the polyurethane fiber has superior heat setting characteristics, high dynamic durability, sufficient resistance to mold and the like, as well as high strength, high elongation, and good elastic recovery. Although the reasons why such a polyurethane fiber having the specific structure described above has the aforementioned superior performance are as yet unclear, the following postulations have been made regarding the relationship between the structure and durability of the polyurethane fiber of the invention. Specifically, in a polyurethane fiber that exhibits either a layer line small angle X-ray scattering image or an eyebrow-shaped four dot small angle X-ray scattering image, when the hard segment of the fiber is examined in a macro manner, it is found to have a relatively uniform distribution, and the soft segment is found to play a considerable role as a tie molecule. This affords the fiber good resistance to external forces, and thus heightens the durability of the fiber.

EXAMPLES

Examples 1–5 below illustrate preferred embodiments of polyurethane fibers the invention and demonstrate their superiority over polyurethane fibers that are outside the invention, such as those of Comparison Examples A and B. Pantyhose made with the polyurethane fibers of the invention are shown to be 2.3 to 5 times as durable in wear tests as pantyhose made with the comparison polyurethane fibers that were outside the invention.

Example 1

In this example a polyurethane solution is made and dry spun into a polyurethane monofilament of the invention and then wear tested in pantyhose.

A nitrogen-blanketted, agitated vessel was charged with 2000 g of PTMG having a molecular weight of 2000 and 503 g of MDI. The additive ratio was 2.01. The contents of the vessel were reacted at 85° C. to obtain an MDI-terminated prepolymer. To 2000 g of the prepolymer, 3840 g of DMAC were added to form a solution of the prepolymer. Then, 68.7 g of EG were added to the prepolymer solution to bring about a chain extension reaction and achieve a hard ratio of 1.0. A small amount of butanol was added was used as a chain-terminating agent in the chain-extension reaction. A polyurethane solution was obtained in which the polyurethane had a number average molecular weight of about 80.000 and a heat softening temperature of 195° C.

The polyurethane solution was then dry spun satisfactorily into a monofilament. A heating temperature (i.e., the temperature of the wall surface of the spinning cylinder) of 200° C., a die with an orifice diameter D of 0.25 mm, an orifice length L of 0.45 mm, and an L/D ratio of 1.8, were used. The monofilament was forwarded with a take-off speed of 700 meters/min, a winding speed of 950 m/min, a speed ratio (winding speed/take-off speed) of 1.36, and a draft ratio of 18. The resultant polyurethane monofilament had a fineness of 18 den (20 dtex), a break strength of 36 grams (which corresponds to a tenacity of 2.0 g/den or 1.8 deciNewtons/tex) and a break elongation of 410%.

Figure 3:
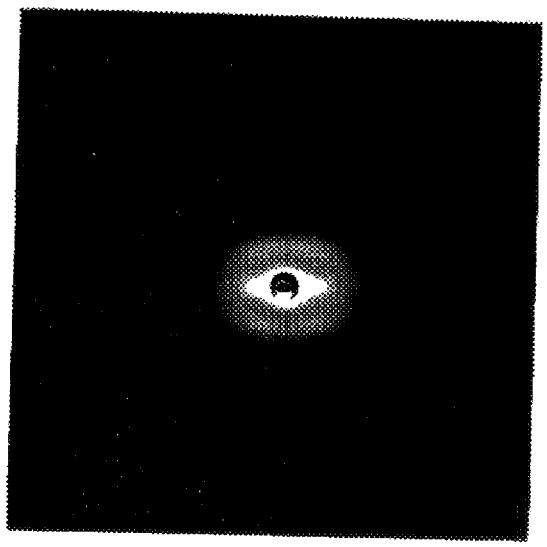
FIGS. 3, 4, 5 and 6 are each a photograph of the small-angle X-ray scattering image obtained with the polyurethane fiber of Examples 1, 3 and 4 and Comparative Example A, respectively.

A small angle X-ray scattering image photograph of this polyurethane fiber was taken and the long periods were determined from the negative of the photograph. FIG. 3, which is a positive of the photographed image, shows a typical eyebrow-shaped four dot scattering image. In this scattering image, the long period in the direction of the meridian was 11 nm, and the long period in the direction of the equator was 17 nm.

A 15-den (17-dtex), 10-filament nylon yarn was wound around the polyurethane fiber to produce a single covered yarn. The covered yarn and a nylon yarn were dyed satisfactorily with acid dye and then were used to prepare a union knit pantyhose sample. The pantyhose sample was then subjected to a wear test in which the sample withstood 10 days of actual use. The pantyhose were also reported to enhance the appearance of the legs of the wearer.

Example 2

In this example, another polyurethane fiber of the invention is made and wear tested.

The same vessel as was used in Example 1 was charged with 2000 g of PTMG having a molecular weight of 2000 and 503 g of MDI. The additive ratio was 2.01, The contents of the vessel were reacted at 85° C. to obtain an MDI-terminated prepolymer. Then, 2000 g of the prepolymer were dissolved in 3890 g of DMAC, and 75.6 g of EG and 20 g of MDI were added to the prepolymer solution to bring about a chain extension reaction and achieve a hard ratio of 1.1. A small amount of butanol was used as a chain-terminating agent in the chain extension reaction. The polyurethane in the solution prepared by this procedure had a number average molecular weight of about 100.000 and a softening temperature of 200° C.

The thusly formed polyurethane solution was then dry spun satisfactorily into monofilament at a heating temperature of 200° C. through a die having an orifice diameter D of 0.20 mm, an orifice length L of 0.50 mm, and an L/D ratio of 2.5. The monofilament was forwarded with a take-off speed of 550 m/min, a winding speed of 900 m/min, a speed ratio (winding speed/take-off speed) of about 1.64, and a draft ratio of 18. The resultant polyurethane fiber had a fineness of 17 den (19 dtex), a strength of 37.4 g, (equivalent to a tenacity of 2.2 g/d or 1.95 dN/tex), and a break elongation of 370%. A small angle X-ray scattering image photograph of the polyurethane fiber showed the same type of eyebrow-shaped four dot scattering image as was obtained for the fiber of Example 1.

A 12-den (13-dtex), 7-filament nylon yarn was wound around the polyurethane monofilament to form a single covered yarn. The single covered yarn was then used to prepare an undergarment, which was dyed with metallized acid dye. The undergarment, which was reported to be "beautiful", was then subjected to a wear test in which the undergarment withstood 15 days of actual use.

Example 3

In this example chips of polyurethane are dissolved to form a solution from which fiber of the invention is dry spun.

A mixture of 1800 g of PTMG having a molecular weight of 1500 and 250 g of BHEB were introduced into a kneader to provide hard ratio of 1.05. Then 615 g of MDI were added to provide an additive ratio of 2.0. After a sufficient reaction was brought about, the reaction mixture was extruded into water and the resultant polyurethane was cut into chips. The thusly produced polyurethane had a number average molecular weight of about 60,000 and a heat softening temperature of 190° C. A polyurethanbe solution was then formed by dissolving 500 g of the polyurethane chips in 1000 g of DMAC The polyurethane solution was then dry spun in the same manner as in Example 1 to obtain a polyurethane monofilament of 20-den (22-dtex) fineness, 32-gram strength (corresponding to a 1.6-g/den or 1.4-dN/tex tenacity) and 350% break elongation.

Figure 4:
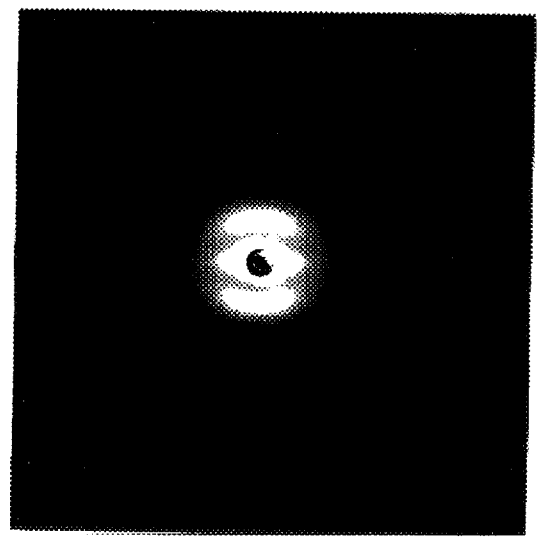

A small angle X-ray scattering image photograph of the polyurethane fiber was taken. A positive of the photograph is shown in FIG. 4. An eyebrow-shaped four dot scattering image is apparent. In this scattering image, the long period in the direction of the meridian was 10 nm, and the long period in the direction of the equator was 19 nm.

A 15-den (16.5-dtex), 10-filament nylon yarn was wound around the polyurethane monofilament to form a single covered yarn. A union knit pantyhose sample was then prepared with the covered yarn in the same manner as in Example 1 and subsequently subjected to wear testing, in which the sample withstood 7 days of actual use.

Example 4

In this example, polyurethane monfilament of the invention was prepared by repeating the procedures of Example 2, except that the heating temperature was changed to 230° C., the winding speed was changed to 680 m/min and two strands of the monofilament were combined by false twisting. A polyurethane filamentof high strenth and high elongation was obtained. Specifically, the filament had a fineness of 20 den (22 dtex) per filament, a strength of 31 g.(corresponding to a tenacity of 1.6 g/d or 1.4 dN/tex) and a break elongation of 440%.

Figure 5:
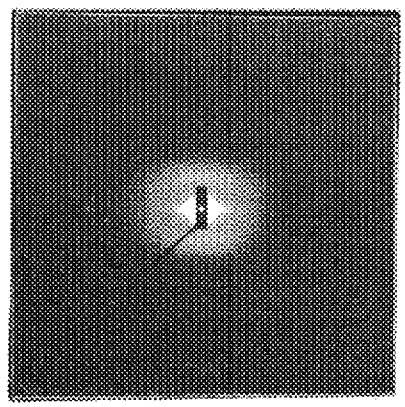
Figure 6:
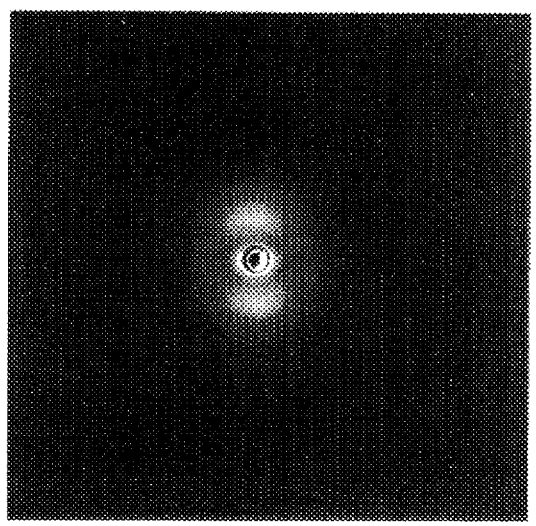

A small angle X-ray scattering image photograph of the filament is displayed in FIG. 5 and shows that a layer line scattering image was obtained. The image had a dot ratio of 2.5, a long/short segment ratio of 1.7, and the long period in the direction of the meridian of 13 nm.

A 12-den (13-dtex), 7-filament nylon yarn was wound around the false-twist combined polyurethane monofilaments to prepare a single covered yarn. An undergarment sample prepared from the covered yarn survived 15 days of wwear test.

Example 5

In this example, durable polyurethane filament of the invention was prepared from a polyurethane formed with two polyols of differing molecular weight. The same reaction vessel and spinning equipment as were used in Example 1 were used in this example.

A mixture of polyols consisting of 667 g of PTMG of 1800 molecular weight and 333 g of PTMG of 3000 molecular weight, along with 28 grams of EG, were dissolved in 3300 g of DMAc. Then, 229 g of MDI were added. The mixture was permitted to react for 9 hours while being stirred and maintained at temperatures of 60° to 70° C. Butanol was added as a chain terminator. The calculated number average molecular weight of the PTMG was 2200; the additive ratio was about 2; and the hard ratio was about 1. The polyurethane in the resultant solution had a molecular weight of about 90,000 and a softening temperature of 190° C.

The polyurethane solution was dry spun satisfactorily at a heating temperature of 220° C. through an orifice of the same dimesions as the orifice employed in Example 1 to form a monofilament that was forwarded from the orifice at a take-off speed of 400 m/min. The monofilament was wound up on a cake with an average crossing angle of 9 degrees at a windup speed of 600 m/min. The speed ratio was 1.5. The woundup filament had an 18-den (20-dtex) fineness, a 28-gram strength (corresponding to a 1.6-g/d or 1.0-dN/tex tenacity) and a 400% elongation. A small angle X-ray scattering image photograph exhibited an eye-brow shaped four dot scattering image, similar to that depicted in FIG. 1.

A 12-den (13-dtex), 7-filament nylon yarn was wound around the monofilament to produce a single covered yarn. The covered yarn was knit into an undergarment of high transparency. The undergarment was dyed with an acid dye and then subjected to wear testing. The sample withstood 15 days of testing.

COMPARATIVE EXAMPLES

Example A

The polyurethane chips obtained in Example 3 were supplied to an extruder of a melt-spinning machine. The polyurethane was melt spun at 230° C. A take-off speed of 650 m/min, a winding speed of 850 m/min, a speed ratio of 1.31 and a draft ratio of 40 were used to produce a polyurethane filament of 20-den (22-dtex) fineness, 21-gram strength (corresponding to a 1.1-g/den of 1.0 dN/tex tenacity) and a 340% elongation. A small angle X-ray scattering image photograph of the thusly produced polyurethane fiber is displayed in FIG. 6. The image exhibits a two dot scattering image typical of conventional polyurethane fibers. The long period in the direction of the meridian was 11 nm.

A 15-den (17-dtex) nylon yarn was wound around the polyurethane monofilament to form a single covered yarn. A pantyhose sample was then prepared with the covered yarn in the same manner as in Example 1 and the sample was then wear tested. The pantyhose sample made with the polyurethane filaments of this comparison sample could withstand only 3 days of wear.

Example B

In this example, a polyurethaneurea fiber that is outside the invention is prepared and wear tested in pantyhose.

Into the same vessel as was used in Example 1, 800 g of PTMG having a molecular weight of 1600 and 200 g of MDI were loaded. The additive ratio was 1.6. A reaction was brought about at 85° C. to obtain an MDI-terminated prepolymer. The prepolymer was then dissolved in 1900 g of DMAC; 30 g of ethylene diamine was added as chain extender; a chain-extension reaction was brought about; and diethylamine was added as a chain-terminating agent. The polyurethaneurea contained in the thusly prepared solution had a molecular weight of about 30,000 and a softening temperature of 275° C.

The solution was then satisfactorily dry spun at a heating temperature of 210° C. through the die and orifice used in Example 1. The filament was produced with a take-off speed of 700 m/min, a winding speed of 880 m/min, a speed ratio of 1.25, and a draft ratio of 18. The thusly formed filament had a fineness of 20 den (22 dtex), a strength of 22 g (corresponding to a tenacity of 1.1 g/den or 1.0 dN/tex), and an elongation of 500%. A small angle X-ray scattering image photograph of the filament showed substantially the same scattering image as was obtained in Comparative Example A. The long period in the direction of the meridian was 9 nm.

A 15-den (17-dtex), 10-filament nylon yarn was wound around the filament to form a single covered yarn. The covered yarn was then used to prepare a pantyhose sample in the same manner as in Example 1. The pantyhose sample was subjected to wear testing in which the sample withstood only 3 days of testing.

We claim:

1. A durable polyurethane fiber, wherein the polyurethane has a structural formula

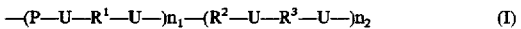

$$-(P-U-R^1-U-)_{n_1}-(R^2-U-R^3-U-)_{n_2} \qquad (I)$$

wherein P is a polyol residue, $R^1$ and $R^3$ are the same or different diisocyanate residues, $R^2$ is a diol residue, U is a urethane bond, and $n_1$ and $n_2$ are each the number of repeating units, the number being in the range of 1 to 10, and wherein the fiber exhibits a small angle X-ray scattering image having a long period in the direction of the meridian of 7 to 16 nanometers, and wherein the image is an eyebrow-shaped four dot scattering image which has a long period in the direction of the equator of 13 to 30 nm or the image of layer line dots.

2. A durable polyurethane fiber according to claim 1, wherein the fiber has a layer line dots small angle X-ray scattering image and a dot ratio, L/W wherein L is the length of the center line of the dots and W is the maximum width of the dots, of at least 1.5.

3. A durable polyurethane fiber according to claim 1 or 2, wherein the low angle X-ray scattering image has a pair of layer line dots wherein an oval can be drawn through the center lines of the pair of layer line dots, and the oval has a long/short segment ratio, as herein defined, of at least 1.3.

4. A durable polyurethane fiber according to claim 1 wherein the fiber has an eyebrow-shaped four dot small angle X-ray scattering image.

5. A durable polyurethane fiber according to claim 1, wherein the diisocyanate residues $R^1$ and $R^3$ are residues of diphenylmethane diisocyanate or dicyclohexylmethane diisocyanate and the diol residue $R^2$ is a residue of ethylene glycol, 1,3-propanediol, 1,4-butanediol, neopentyl glycol, 1,2-propylene glycol, 1,4-cyclohexane dimethanol, 1,4-cyclohexanediol, 1,4-bis(β-hydroxyethoxy)benzene, bis(β-hydroxyethyl)terephthalate, or paraxylene diol.

6. A durable polyurethane fiber according to claim 5, wherein the polyol residue P is a residue of polytetramethyleneether glycol or polytetramethyleneether glycol copolymer and the diisocyanate residues $R^1$ and $R^3$ are each a residue of diphenyl methane diisocyanate and the diol residue $R^2$ is a residue of ethylene glycol, 1,3-propanediol, 1,4-butanediol, or 1,4-bis(β-hydroxyethoxy)benzene.

7. A durable polyurethane fiber according to claim 1, wherein the number average molecular weight of the polyol residue P is 800 to 3500 and the number average molecular weight of the polyurethane is 30,000 to 200,000.

8. A durable polyurethane fiber according to claim 1, wherein the polyol residue P has an average molecular weight in the range of 1200 to 2600 and comprises a mixture of two polyol residues, one residue having a molecular weight in the range of 800 to 2500 and the second residue having a molecular weight in the range of 1600 to 4000.

9. A durable polyurethane fiber according to claim 1 having an additive ratio (NCO/OH) as hereinbefore defined in the range of 1.7 to 3, and a hard ratio ($n_2/n_1$) in the range of 0.65 to 3.

10. A durable polyurethane fiber according to claim 1, wherein the fiber has a tenacity of at least 1.3 dN/tex and an elongation is at least 300%.

11. A durable polyurethane fiber according to claim 1, wherein the fiber has been dry spun.

12. A durable polyurethane fiber according to claim 1, wherein the fiber has softening temperature in the range of 130° to 250° C.

13. A durable polyurethane fiber according to claim 1, wherein the fiber has a fineness of no greater than 33 dtex.

14. A durable polyurethane polymer according to claim 1, wherein the fiber is a monofilament or two coalesced side-by-side monofilaments.

* * * * *